(12) United States Patent
Kohara et al.

(10) Patent No.: US 11,639,198 B2
(45) Date of Patent: May 2, 2023

(54) VEHICLE LOWER STRUCTURE

(71) Applicant: Mazda Motor Corporation, Hiroshima (JP)

(72) Inventors: Yasuhiro Kohara, Hiroshima (JP); Katsumasa Sogame, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 172 days.

(21) Appl. No.: 17/176,179

(22) Filed: Feb. 16, 2021

(65) Prior Publication Data

US 2021/0300473 A1 Sep. 30, 2021

(30) Foreign Application Priority Data

Mar. 31, 2020 (JP) .............................. JP2020-063299

(51) Int. Cl.
*B62D 21/15* (2006.01)
*B60L 50/60* (2019.01)
*B60L 58/10* (2019.01)
*B60K 6/26* (2007.10)
*B60K 6/28* (2007.10)
(Continued)

(52) U.S. Cl.
CPC ............... *B62D 21/15* (2013.01); *B60K 6/26* (2013.01); *B60K 6/28* (2013.01); *B60L 50/66* (2019.02); *B60L 58/10* (2019.02); *B62D 25/20* (2013.01); *B60K 2001/0438* (2013.01); *B60Y 2306/01* (2013.01)

(58) Field of Classification Search
CPC ........ B60Y 2306/01; B60K 2001/0438; B60K 2001/0422; B60K 2001/0433; B60K 6/28; B60L 50/66; B62D 21/15; B62D 21/157
See application file for complete search history.

(56) References Cited

U.S. PATENT DOCUMENTS 9,096,117 B2   8/2015 Matsuda et al.
2015/0107921 A1*  4/2015 Naruke ................ B60K 1/04
                                                180/68.5
2017/0088182 A1*  3/2017 Hara ................ B62D 25/2072

FOREIGN PATENT DOCUMENTS

DE   102017221666 A1 *  6/2018 ............... B60K 1/00
EP       2996893 A1      3/2016
JP       5483293 B2      5/2014
(Continued)

OTHER PUBLICATIONS

Koichiro Watanabe, Arrangement for protecting a battery pack, Jun. 28, 2018, EPO, DE 10 2017 221 666 A1, Machine Translation of Description (Year: 2018).*

(Continued)

*Primary Examiner* — James A English
(74) *Attorney, Agent, or Firm* — Xsensus LLP

(57) ABSTRACT

A vehicle lower structure includes a battery pack arranged under a floor panel and having: first and second battery units that are separately arranged from each other on both sides in the vehicle width direction of the propeller shaft; and a battery cover. The battery cover has a first battery accommodation section, a second battery accommodation section, and a coupling section that couples the first and second battery accommodation section and extends in the vehicle width direction. The coupling section includes a fragile section between the first and second battery accommodation sections in the vehicle width direction.

19 Claims, 10 Drawing Sheets

(51) Int. Cl.
*B62D 25/20* (2006.01)
*B60K 1/04* (2019.01)

(56) References Cited

FOREIGN PATENT DOCUMENTS

JP  2017121871 A  *  7/2017
WO  2014/183995 A1    11/2014

OTHER PUBLICATIONS

Takahiro Fukuoka, Vehicle Body Rear Structure, Jul. 13, 2017, EPO, JP 2017-121871 A, Machine Translation of Description (Year: 2017).*
Extended European search report dated May 3, 2021, in corresponding European patent Application No. 21157013.0, 7 pages.

* cited by examiner

VEHICLE LOWER STRUCTURE

CROSS REFERENCE TO RELATED APPLICATION

The present application claims priority to Japanese App. No. 2020-063299 filed Mar. 31, 2020, the entire content and disclosure of which is incorporated by reference herein in its entirety.

TECHNICAL FIELD

The present disclosure relates to a vehicle lower structure.

BACKGROUND ART

A hybrid vehicle in which an engine and a drive motor as drive sources are arranged in a vehicle front side, in which a propeller shaft is arranged under a floor panel constituting a floor surface of a cabin, and in which power from at least one of the engine and the drive motor is transmitted to drive wheels arranged in a vehicle rear side by the propeller shaft has been known.

The hybrid vehicle in which plural battery modules for storing electricity to be supplied to the drive motor are connected and unitized as a battery unit and in which, at a position under the floor panel, the battery unit is arranged on each side in a vehicle width direction of the propeller shaft has also been known.

For example, in Patent document 1, a vehicle lower structure in which, at the position under the floor panel, the battery unit is arranged on each of the sides in the vehicle width direction of the propeller shaft is disclosed. In the vehicle lower structure disclosed in Patent document 1, a battery pack that includes the battery unit arranged on each of the sides in the vehicle width direction of the propeller shaft is attached to the floor panel in a manner to cover the propeller shaft from below.

PRIOR ART DOCUMENTS

Patent Documents

[Patent document 1] Japanese Patent No. 5,483,293

SUMMARY

According to one or more embodiments a vehicle lower structure is disclosed or implemented. The vehicle lower structure can include: a drive source having a drive motor; a floor panel forming a floor surface of a cabin; and a propeller shaft extending in a vehicle longitudinal direction at a position under the floor panel to transmit power from the drive source to a drive wheel, the vehicle lower structure comprising: a battery pack arranged under the floor panel and having: a first battery unit and a second battery unit that are separately arranged from each other on both sides in a vehicle width direction of the propeller shaft and storing electricity to be supplied to the drive motor; and a battery cover, wherein the battery cover has: a first battery accommodation section accommodating the first battery unit; a second battery accommodation section accommodating the second battery unit; and a coupling section that couples the first battery accommodation section and the second battery accommodation section and extends in the vehicle width direction, and the coupling section includes a fragile section between the first battery accommodation section and the second battery accommodation section in the vehicle width direction, the fragile section being fragile with respect to an impact load that is applied to the battery pack from an outer side in the vehicle width direction.

DETAILED DESCRIPTION

Figure 1:
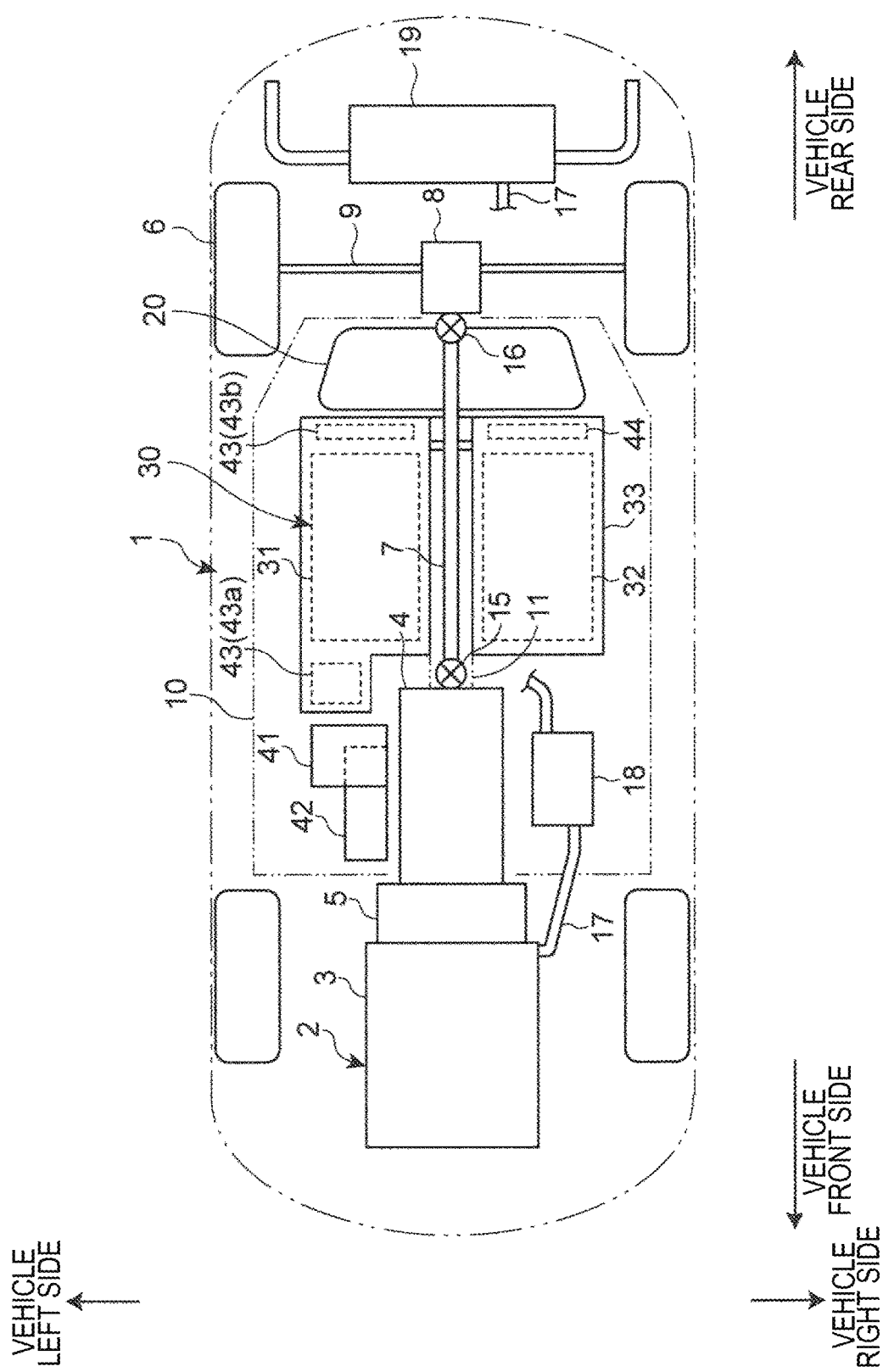
FIG. 1 is a schematic view of a vehicle body to which a vehicle lower structure according to an embodiment of the present disclosure is applied.

A description will hereinafter be made on an embodiment of the present disclosure with reference to the accompanying drawings.

In a hybrid vehicle in which, at the position under the floor panel, first and second battery units are arranged on both sides in the vehicle width direction of the propeller shaft, there can be a case where the first and second battery units are integrated as the battery pack and attached to the position under the floor panel.

In the vehicle in which the battery pack having the first and second battery units, which are arranged on both sides in the vehicle width direction of the propeller shaft, is attached to the position under the floor panel, when a collision load is applied thereto from an outer side in the vehicle width direction during a lateral collision such as a collision with a poll, the battery pack is possibly broken, which possibly damages the first and second battery units.

In view of the above, one or more embodiments of the present disclosure can have a purpose of providing a vehicle lower structure capable of protecting first and second battery units during a lateral collision in a vehicle that includes a battery pack arranged under a floor panel and having the first and second battery units arranged on both sides in a vehicle width direction of a propeller shaft.

In order to solve the above problem and other problems, the inventors of the present application repeatedly made earnest analyses on movement and deformation of a vehicle lower portion and components disposed in the vehicle lower portion during a lateral collision in a vehicle that includes a battery pack arranged under a floor panel and having first and second battery units on both sides in a vehicle width direction of a propeller shaft. As a result, the inventors of the present application found that the first and second battery units were damaged when the battery pack rotationally moved during the lateral collision with a center portion of a coupling section between the first and second battery units therein being a center and interfered with a vehicle body component and the like, and completed the one or more embodiments of the present disclosure.

One or more embodiments of the present disclosure can thus provide a vehicle lower structure including: a drive source having a drive motor; a floor panel forming a floor surface of a cabin; and a propeller shaft extending in a vehicle longitudinal direction at a position under the floor panel to transmit power from the drive source to a drive wheel. The vehicle lower structure includes a battery pack arranged under the floor panel and having: a first battery unit and a second battery unit that are separately arranged from each other on both sides in a vehicle width direction of the propeller shaft and storing electricity to be supplied to the drive motor; and a battery cover. The battery cover has: a first battery accommodation section accommodating the first battery unit; a second battery accommodation section accommodating the second battery unit; and a coupling section that couples the first battery accommodation section and the second battery accommodation section and extends in the vehicle width direction. The coupling section can include a fragile section between the first battery accommodation section and the second battery accommodation section in the vehicle width direction, the fragile section being fragile with respect to an impact load that is applied to the battery pack from an outer side in the vehicle width direction.

According to one or more embodiments of the present disclosure, the battery pack having: the first and second battery units that are separately arranged from each other on both sides in the vehicle width direction of the propeller shaft; and the battery cover is arranged under the floor panel. The battery cover has the first battery accommodation section, the second battery accommodation section, and the coupling section that couples the first and second battery accommodation sections and extends in the vehicle width direction. The coupling section can include the fragile section between the first and second battery accommodation sections in the vehicle width direction.

In this way, in a vehicle that includes the battery pack arranged under the floor panel and having the first and second battery units arranged on both sides in the vehicle width direction of the propeller shaft, when an impact load is applied to the battery pack from an outer side in the vehicle width direction during a lateral collision, the fragile section provided in the coupling section can be crushed and deformed. In this way, it can be possible to suppress the first and second battery accommodation sections from being crushed and deformed. Therefore, it can be possible to protect the first and second battery units that are respectively arranged in the first and second battery accommodation sections.

Also, in the case where the impact load from the outer side in the vehicle width direction is applied to the battery pack at a position that is offset from the coupling section in the vehicle longitudinal direction, the fragile section provided in the coupling section can be crushed and deformed. In this way, it is possible to suppress the battery pack from rotationally moving with a portion of the coupling section between the first and second battery accommodation sections therein being a center. As a result, the first and second battery units can be protected. That is, when a collision load is applied to the battery pack, due to the crush and the deformation of the fragile section, the battery accommodation sections, which receive the collision load, can move inward in the vehicle width direction. Thus, the first and second battery accommodation sections, which receive the collision load, can be suppressed from rotationally moving with the portion between the battery accommodation sections in the battery pack being the center. It can thus be possible to suppress concentration of the collision load on the portions of the battery accommodation sections, which receive the collision load, due to the rotational movement and damage to such portions. Therefore, the battery units can be protected.

The coupling section can couple vehicle rear sides of the first battery accommodation section and the second battery accommodation section, and can extend in the vehicle width direction at a position above the propeller shaft.

With such a configuration, the vehicle rear sides of the first and second battery accommodation sections can be coupled by the coupling section that extends in the vehicle width direction at the position above the propeller shaft. Thus, even in the case where the impact load is applied to the propeller shaft from the front side of the vehicle body during the frontal collision, and the propeller shaft can move downward and be deformed, and it can be possible to suppress the propeller shaft from coming into contact with battery pack. Therefore, the battery pack can be protected.

Also, in the case where the impact load from the outer side in the vehicle width direction is applied to a vehicle front side and a center side in the vehicle longitudinal direction of the battery pack, the fragile section provided in the coupling section can be crushed and deformed. Thus, it can be possible to suppress the first and second battery accommodation sections from being crushed and deformed. As a result, the first and second battery units can be protected.

In the case where a high-voltage harness that electrically connects the first and second battery units is arranged in the coupling section, due to arrangement of the coupling section above the propeller shaft, it may be difficult for a worker to access to the high-voltage harness. Thus, it can be possible to suppress the worker from coming into contact with the high-voltage harness.

The vehicle rear sides of the first and second battery accommodation sections can be coupled by the coupling section, which extends in the vehicle width direction, at the position above the propeller shaft. Thus, in the case where the floor panel is formed with a stepped portion that is projected upward in a manner to correspond to the coupling section, the step portion can be provided in a vehicle rear side of the floor panel. As a result, compared to a case where the coupling section couples center portions in the vehicle longitudinal direction of the first and second battery accommodation sections, a cabin space can be used effectively.

The fragile section can be formed such that a length thereof in a vertical direction is shorter than the rest of portions of the coupling section other than the fragile section.

With such a configuration, the fragile section can be formed by reducing a length in the vertical direction of the coupling section to be shorter than the rest of the portions thereof. Thus, the fragile section can be formed relatively easily, and the above effect can thereby be obtained relatively easily.

The fragile section can be formed to be thinner than the rest of the portions of the coupling section other than the fragile section.

With such a configuration, the fragile section can be formed by the portion of the coupling section to be thinner than the rest of the portions thereof. Thus, the fragile section can be formed relatively easily, and the above effect can thereby be obtained relatively easily.

The fragile section can have a concave section that extends in an orthogonal direction to the vehicle width direction and is dented in the coupling section.

With such a configuration, the fragile section can be formed by forming the concave section that is dented in the coupling section. Thus, the fragile section can be formed relatively easily, and the above effect can thereby be obtained relatively easily.

A battery control unit and a junction box can be arranged on both sides in the vehicle width direction of the fragile section in the coupling section.

With such a configuration, the battery control unit and the junction box can be arranged on both sides in the vehicle width direction of the fragile section in the coupling section. Thus, when the collision load is applied from the outer side in the vehicle width direction during the lateral collision, the fragile section provided in the coupling section can be crushed and deformed. In this way, the battery control unit and the junction box can be protected.

With the vehicle lower structure according to one or more embodiments of the present disclosure, in the vehicle that includes the battery pack arranged under the floor panel and having the first and second battery units arranged on both sides in the vehicle width direction of the propeller shaft, the first and second battery units can be protected during the lateral collision.

FIG. 1 is a schematic view of a vehicle body to which a vehicle lower structure according to the embodiment of the present disclosure is applied. A vehicle according to the embodiment of the present disclosure is a hybrid vehicle in a front-engine, rear-wheel-drive layout that has, as drive sources, an engine and a drive motor arranged in a vehicle front side and that transmits power from at least one of the engine and the drive motor to rear wheels as drive wheels arranged in a vehicle rear side.

As illustrated in FIG. 1, a vehicle body 1 of the hybrid vehicle has: an engine 3 as a drive source 2; an automatic transmission 4 as a transmission that is coupled to the engine 3; a motor (a drive motor) 5 as the drive source 2 that is arranged between the engine 3 and the automatic transmission 4; a propeller shaft 7 that is coupled to the automatic transmission 4 and transmits power from the drive source 2 to rear wheels 6; and a differential 8 that is coupled to the propeller shaft 7 and transmits the power from the drive source 2 to the right and left rear wheels 6.

At a position under a floor panel 10 that constitutes a floor surface of a cabin 25, the propeller shaft 7 extends in a vehicle longitudinal direction. A tunnel section 11 is provided in a center side in a vehicle width direction of the floor panel 10. The propeller shaft 7 is arranged inside the tunnel section 11. A front end portion of the propeller shaft 7 is coupled to the automatic transmission 4 via a universal joint 15, and a rear end portion of the propeller shaft 7 is coupled to the differential 8 via a universal joint 16.

In the vehicle body 1, when an impact load is applied from a vehicle front side to the drive source 2 during a frontal collision, the differential 8 receives the impact load through the propeller shaft 7. When the differential 8 receives the impact load, the differential 8 may no longer be supported by the vehicle body 1, and a vehicle front side of the differential 8 can rotate downward with an axle 9 being a fulcrum. When the vehicle front side of the differential 8 rotates downward, a vehicle rear side of the propeller shaft 7 can move downward and can be deformed, and the drive source 2 can move rearward in the vehicle body. In this way, an impact absorption property can be enhanced.

The vehicle body 1 includes an exhaust pipe 17 that extends in the vehicle longitudinal direction from the engine 3. At a position under the tunnel section 11, the exhaust pipe 17 is disposed under the propeller shaft 7. A catalytic device 18 that includes a catalyst for purifying exhaust gas of the engine 3 is disposed as an exhaust system component on an upstream side of the exhaust pipe 17. A silencer 19 that reduces noise generated at the time of releasing the exhaust gas of the engine 3 to the atmosphere is disposed as the exhaust system component on a downstream side of the exhaust pipe 17.

The vehicle body 1 includes: a fuel tank 20 that stores fuel to be supplied to the engine 3; and a battery 30 that stores electricity to be supplied to the motor 5. The motor 5 transmits the power to the rear wheels 6. In addition, during deceleration of the vehicle, the motor 5 can be rotationally driven by the propeller shaft 7 and performs regenerative power generation to supply the generated electricity to the battery 30.

The battery 30 is formed as a battery pack 33 in which a first battery unit 31 and a second battery unit 32 are provided in an integrated manner. The first battery unit 31 and the second battery unit 32 are separately arranged from each other on both sides in the vehicle width direction of the propeller shaft 7. Each of the first and second battery units 31, 32 is formed such that plural battery modules for storing the electricity to be supplied to the motor 5 are connected and unitized. The battery module includes plural battery cells, and the battery cell is a lithium-ion battery, for example.

The fuel tank 20 and the first and second battery units 31, 32 are arranged under the floor panel 10. The fuel tank 20 is arranged on a vehicle rear side of the first and second battery units 31, 32 and is arranged to be higher than the first and second battery units 31, 32.

At positions near the first and second battery units 31, 32, battery-related electrical components that are related to the battery 30 are arranged. As the battery-related electrical components, high-voltage components such as an inverter 41, a DC/DC converter 42, and a junction box 43 that are electrically connected to the first and second battery units 31, 32 are arranged. The high-voltage component and a high-voltage harness, which will be described below, respectively mean a component and a harness to which an AC voltage exceeding 30V or a DC voltage exceeding 60V is applied.

The inverter 41 converts DC power stored in the battery 30 into AC power and supplies the AC power to the motor 5. In addition, during the deceleration of the vehicle, the inverter 41 converts the AC power generated by the motor 5 into the DC power and charges the battery 30 with the DC power. The DC/DC converter 42 converts high-voltage DC power, such as 300 volts, stored in the battery 30 into low-voltage DC power, such as 12 volts, and supplies the low-voltage DC power to an auxiliary machine and the like.

The junction box 43 includes: a front junction box 43a that is arranged on a vehicle front side of the first and second battery units 31, 32; and a rear junction box 43b that is arranged on a vehicle rear side of the first and second battery units 31, 32.

Each of the front and rear junction boxes 43a, 43b is a so-called connection box for protecting terminals used for connecting, branching, and relaying harnesses, and has a high-voltage relay, a fuse, and the like. The front and rear junction boxes 43a, 43b are electrically connected to the first and second battery units 31, 32.

The first and second battery units 31, 32 are electrically connected to each other by a battery harness as a high-voltage harness. The first and second battery units 31, 32 and the battery-related electrical components 41, 42, 43 are also electrically connected to each other by the battery harness as the high-voltage harness. The first and second battery units 31, 32 share the battery-related electrical components such as the junction box 43.

A battery control unit 44 for controlling the first and second battery units 31, 32 is arranged near the first and second battery units 31, 32. The battery control unit 44 is electrically connected to the first and second battery units 31, 32, the battery-related electrical components 41, 42, 43, and the like by harnesses.

Next, a specific description will be made on the vehicle lower structure according to the embodiment of the present disclosure with reference to FIG. 2 to FIG. 9.

Figure 2:
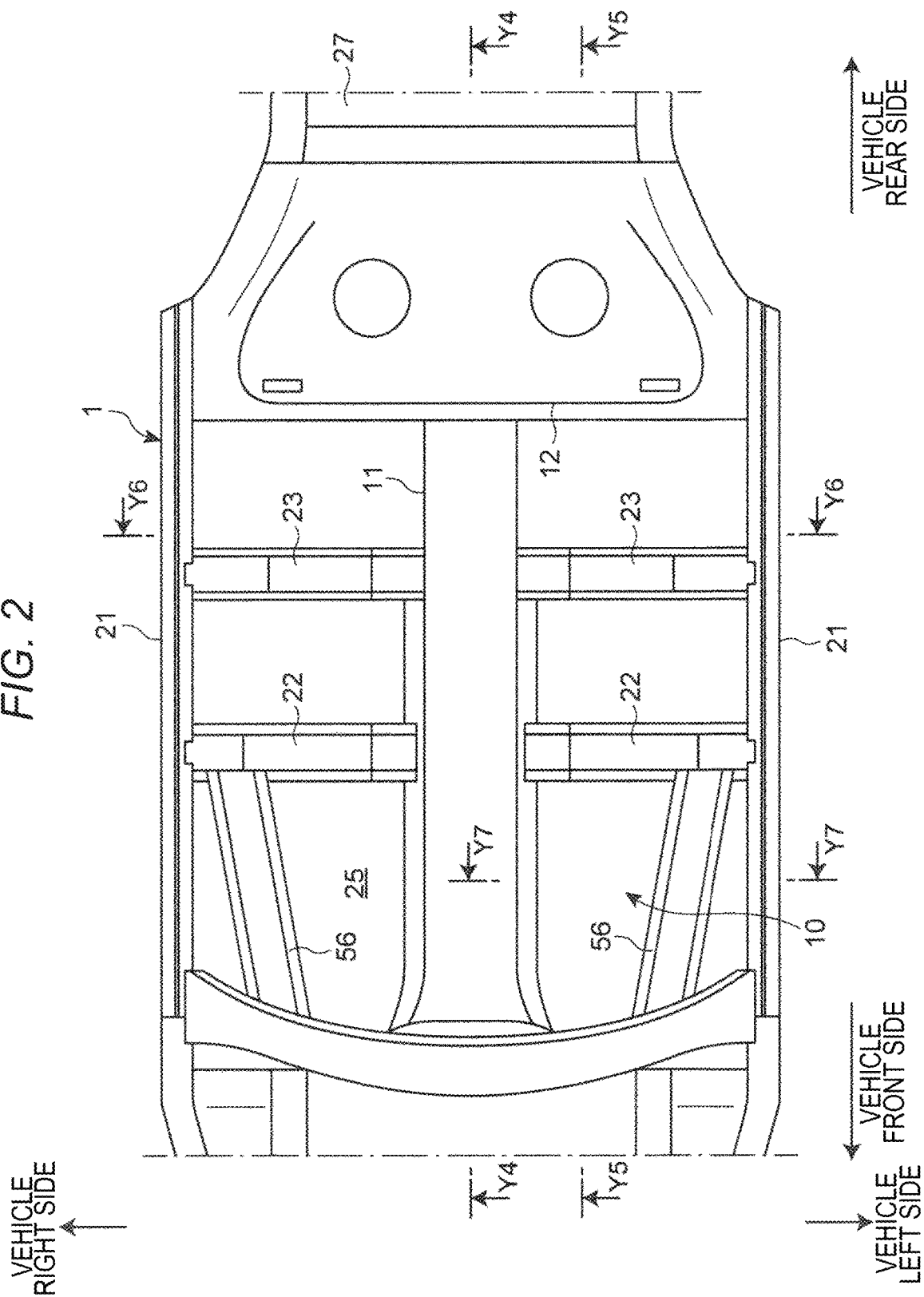
FIG. 2 is a top view of the vehicle body to which the vehicle lower structure according to the embodiment of the present disclosure is applied.
Figure 3:
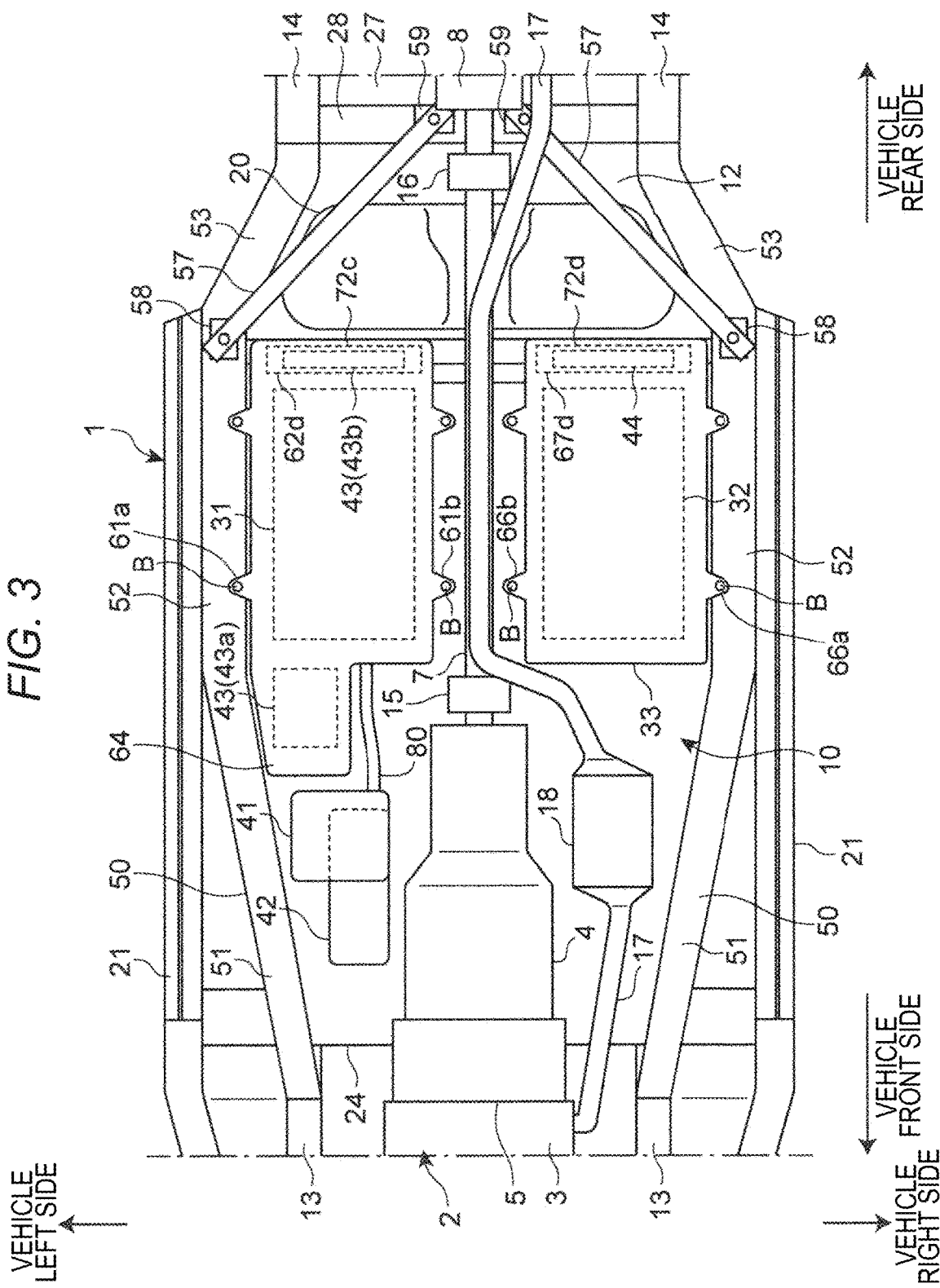
FIG. 3 is a bottom view of the vehicle body to which the vehicle lower structure according to the embodiment of the present disclosure is applied.
Figure 4:
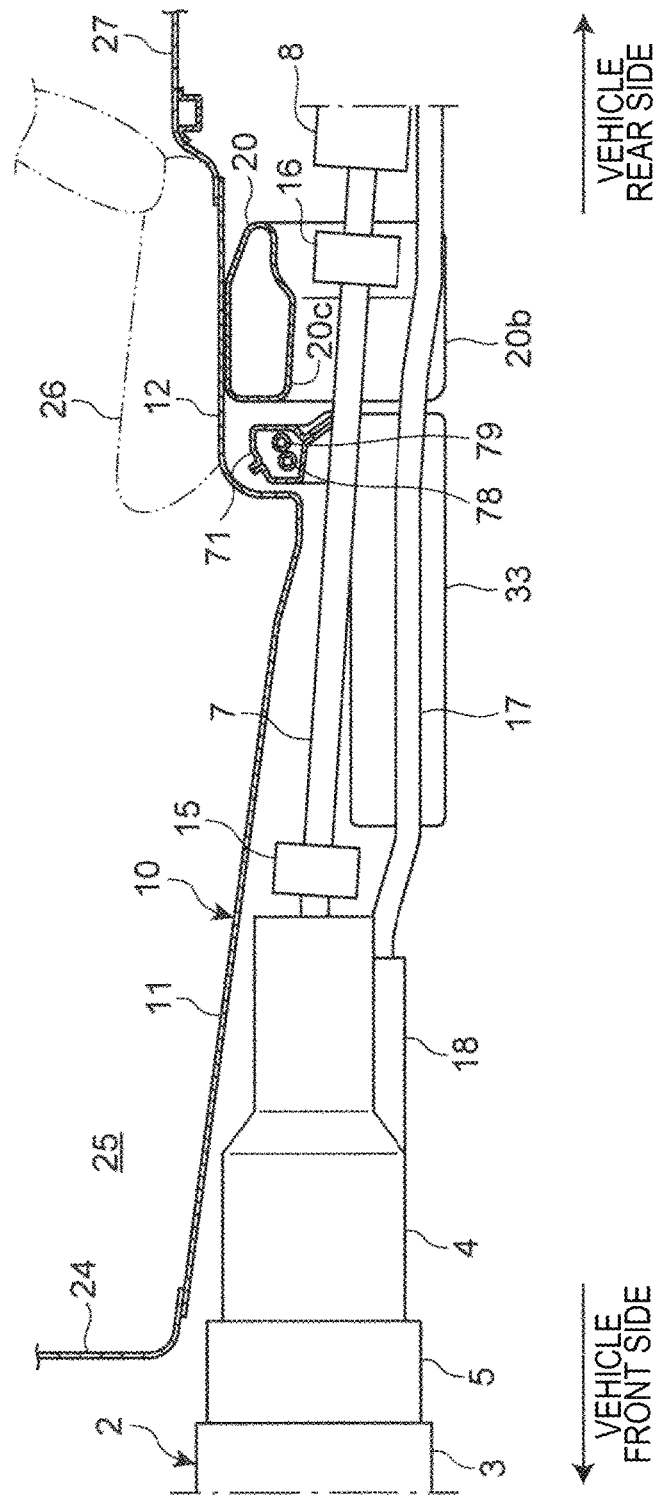
FIG. 4 is a cross-sectional view of the vehicle body that is taken along line Y4-Y4 in FIG. 2.
Figure 5:
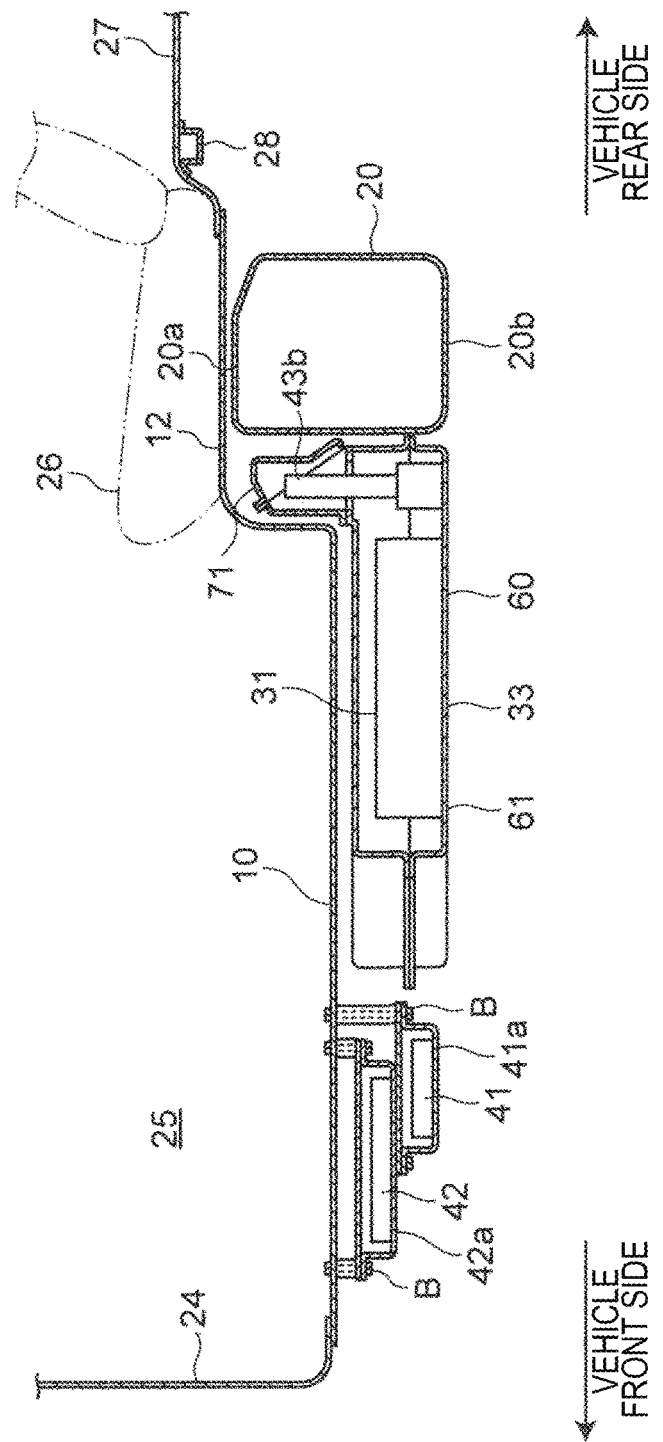
FIG. 5 is a cross-sectional view of the vehicle body that is taken along line Y5-Y5 in FIG. 2.
Figure 6:
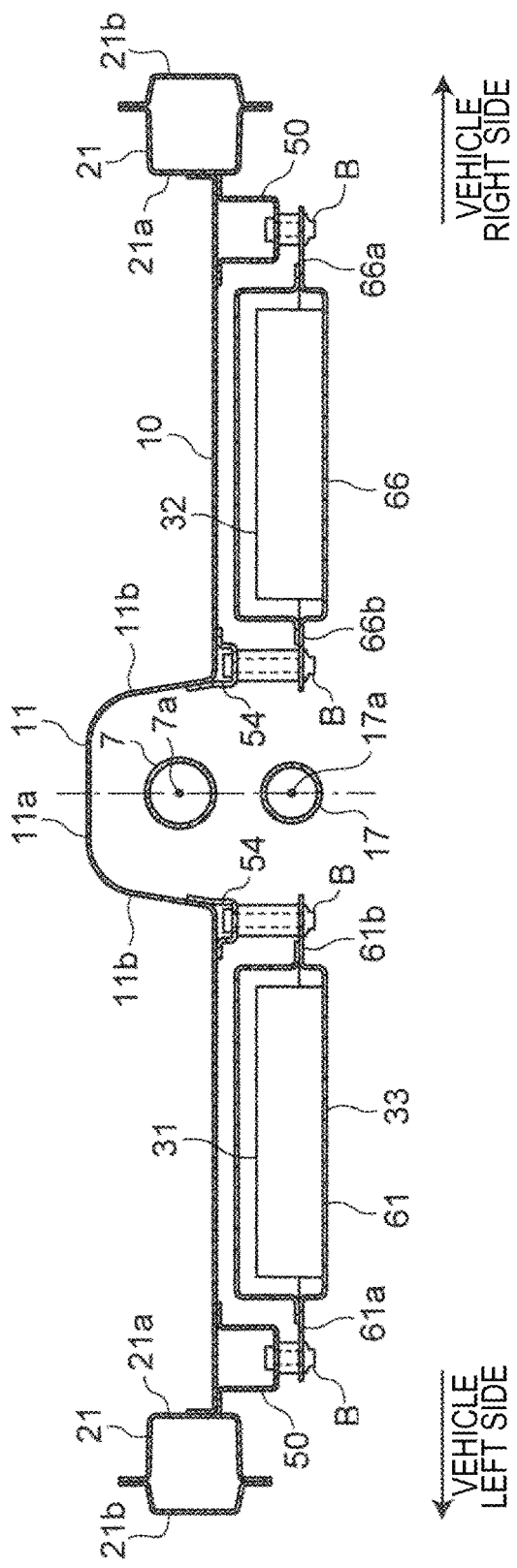
FIG. 6 is a cross-sectional view of the vehicle body that is taken along line Y6-Y6 in FIG. 2.
Figure 7:
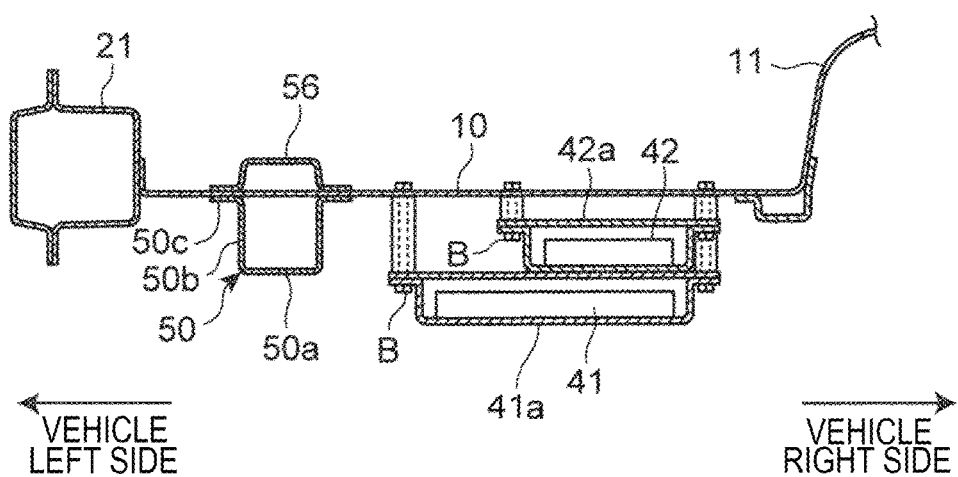
FIG. 7 is a cross-sectional view of the vehicle body that is taken along line Y7-Y7 in FIG. 2.

FIG. 2 is a top view of the vehicle body 1 to which the vehicle lower structure according to the embodiment of the present disclosure is applied. FIG. 3 is a bottom view of the vehicle body 1 to which the vehicle lower structure according to the embodiment of the present disclosure is applied. FIG. 4 is a cross-sectional view of the vehicle body 1 that is taken along line Y4-Y4 in FIG. 2. FIG. 5 is a cross-sectional view of the vehicle body 1 that is taken along line Y5-Y5 in FIG. 2. FIG. 6 is a cross-sectional view of the vehicle body 1 that is taken along line Y6-Y6 in FIG. 2. FIG. 7 is a cross-sectional view of the vehicle body 1 that is taken along line Y7-Y7 in FIG. 2.

As illustrated in FIG. 2, the vehicle body 1 includes the floor panel 10, right and left side sills 21, a first crossmember 22, and a second crossmember 23 in a lower portion of the vehicle body 1. The right and left side sills 21 are joined to both end portions in the vehicle width direction of the floor panel 10 and extend linearly in the vehicle longitudinal direction. On an upper surface side of the floor panel 10, the first crossmember 22 and the second crossmember 23 are each hung between the right and left side sills 21 and extend in the vehicle width direction.

In the center side in the vehicle width direction, the floor panel 10 is formed with the tunnel section 11 that extends in the vehicle longitudinal direction and bulges upward. As illustrated in FIG. 6, the tunnel section 11 includes an upper surface portion 11*a* and side surface portions 11*b* on both sides, and is opened downward. As illustrated in FIG. 5, a front end portion of the floor panel 10 is coupled to a dashboard 24. The dashboard 24 defines a vehicle front side of the cabin 25 and extends in a vehicle body vertical direction.

The floor panel 10 has a kick-up section 12 in a rear portion of the floor panel 10. The kick-up section 12 is formed to be higher than a front portion of the floor panel 10. The kick-up section 12 is provided under a rear seat 26. The kick-up section 12 extends upward from the front portion of the floor panel 10 and then extends rearward in the vehicle in a substantially horizontal direction.

A rear floor panel 27 that is formed to be higher than a rear end portion of the kick-up section 12 is joined to a rear end portion of the floor panel 10, more specifically, the rear end portion of the kick-up section 12. The rear floor panel 27 extends upward from the rear end portion of the kick-up section 12 and then extends rearward in the vehicle in the substantially horizontal direction.

A third crossmember 28 is attached to a lower surface side of the rear floor panel 27. The third crossmember 28 is hung between front end portions of right and left rear frames 14 and extends in the vehicle width direction. The third crossmember 28 is formed to have a substantially hat-shaped cross section and is joined to the rear floor panel 27.

As illustrated in FIG. 6, in each of the right and left side sills 21, a side sill inner 21*a* constitutes a vehicle body inner side of the side sill 21, a side sill outer 21*b* constitutes a vehicle body outer side of the side sill 21, and the side sill inner 21*a* and the side sill outer 21*b* are joined to each other. In this way, each of the right and left side sills 21 has a closed cross-sectional shape.

The first and second crossmembers 22, 23 are separately arranged from each other in the vehicle longitudinal direction. The first crossmember 22 is arranged in front of the vehicle of the second crossmember 23. Each of the first and second crossmembers 22, 23 is formed to have a substantially hat-shaped cross section and is joined to the floor panel 10.

Each of the first and second crossmembers 22, 23 is divided in the vehicle width direction by the tunnel section 11. In each of the divided first and second crossmembers 22, 23, an outer end portion thereof in the vehicle width direction is joined to the side sill 21, and an inner end portion thereof in the vehicle width direction is joined to the tunnel section 11.

As illustrated in FIG. 3, right and left floor frames 50 are disposed on a lower surface side of the floor panel 10. The right and left floor frames 50 separate from each other in the vehicle width direction and extend in the vehicle longitudinal direction. Each of the right and left floor frames 50 is arranged on an inner side in the vehicle width direction of respective one of the right and left side sills 21, and is arranged between one of the side sills 21 and the tunnel section 11 in the vehicle width direction.

As illustrated in FIG. 7, the floor frame 50 includes a lower surface portion 50*a*, side surface portions 50*b* on both sides, and flange portions 50*c* on both sides, and is formed to have a substantially hat-shaped cross section. The flange portions 50*c* on both sides are joined to the floor panel 10. In this way, the floor frame 50 cooperates with the floor panel 10 to have a closed cross-sectional shape.

Front end portions of the right and left floor frames 50 are coupled to right and left front frames 13, respectively. The right and left front frames 13 are disposed in the vehicle front side in a manner to separate from each other in the vehicle width direction, and extend substantially linearly in the vehicle longitudinal direction. Each of the right and left front frames 13 is formed to have a closed cross-sectional shape and extends forward in the vehicle from the dashboard 24.

Rear end portions of the right and left floor frames 50 are coupled to the right and left rear frames 14, respectively. The right and left rear frames 14 are disposed in the vehicle rear side in a manner to separate from each other in the vehicle width direction, and extend substantially linearly in the vehicle longitudinal direction. Each of the right and left rear frames 14 is formed to have a substantially hat-shaped cross section, is attached to the lower surface side of the rear floor panel 27, and cooperates with the rear floor panel 27 to have a closed cross-sectional shape.

Each of the right and left floor frames 50 has a front inclined section 51, a width increased section 52, and a rear inclined section 53. The front inclined section 51 is inclined to the outer side in the vehicle width direction from the vehicle front side toward the vehicle rear side. The width increased section 52 extends linearly and rearward in the vehicle from the front inclined section 51, and a width thereof is increased to the outer side in the vehicle width direction. The rear inclined section 53 is inclined to the inner side in the vehicle width direction from the width increased section 52 toward the vehicle rear side. Each of the right and left floor frames 50 is formed such that a width in a center side in the vehicle longitudinal direction is increased to the outer side in the vehicle width direction in comparison with a vehicle front side and a vehicle rear side and that a distance between the right and left width increased sections 52 in the vehicle width direction is longer than that between the front inclined sections 51 and that between the rear inclined sections 53.

As illustrated in FIG. 6, right and left tunnel reinforcing members 54 are joined to the lower surface side of the floor panel 10. The right and left tunnel reinforcing members 54 are disposed on both sides in the vehicle width direction of the tunnel section 11 in a manner to separate from each other in the vehicle width direction and extend in the vehicle longitudinal direction. The tunnel reinforcing member 54 is joined to the lower surface side of the floor panel 10 and cooperates with the floor panel 10 to have a closed cross-sectional shape.

As illustrated in FIG. 2, right and left floor reinforcing members 56 are joined to the upper surface side of the floor panel 10. The right and left floor reinforcing members 56 each extend in the vehicle longitudinal direction along the front inclined section 51 of the floor frame 50. The floor reinforcing member 56 cooperates with the floor panel 10 to have a closed cross-sectional shape. A front end portion of the floor reinforcing member 56 is joined to the dashboard 24, and a rear end portion of the floor reinforcing member 56 is joined to the first crossmember 22. Vehicle body components such as the floor panel 10, the floor frame 50, and the tunnel reinforcing member 54 are each formed by pressing a steel sheet, for example.

At the positions under the floor panel 10, the automatic transmission 4 and the propeller shaft 7 are arranged in the center side in the vehicle width direction. As illustrated in FIG. 4, the automatic transmission 4 and the propeller shaft 7 are arranged in the tunnel section 11 and are supported by the vehicle body 1. As illustrated in FIG. 3, the automatic transmission 4 is arranged between the front inclined sections 51 of the right and left floor frames 50, and the propeller shaft 7 is arranged between the width increased sections 52 or the rear inclined sections 53 of the right and left floor frames 50.

At a position under the floor panel 10, the fuel tank 20 is disposed between the rear inclined sections 53 of the right and left floor frames 50. The fuel tank 20 is arranged under the kick-up section 12 of the floor panel 10 and is arranged to be higher than the front portion of the floor panel 10.

As illustrated in FIG. 5, an upper surface portion 20a of the fuel tank 20 is arranged to be higher than the front portion of the floor panel 10, and a lower surface portion 20b of the fuel tank 20 is arranged to be lower than the front portion of the floor panel 10. The fuel tank 20 is formed to extend between both sides in the vehicle width direction and extend in the vehicle longitudinal direction. The fuel tank 20 is formed with a hollow space that stores the fuel therein.

As illustrated in FIG. 4, the fuel tank 20 has a concave section 20c at a center side in the vehicle width direction of the lower surface portion 20b. The concave section 20c is dented upward in a substantially semicircular cross-sectional shape so as to avoid interference with the propeller shaft 7. As illustrated in FIG. 3, the fuel tank 20 is supported from below by right and left fixture belts 57 for fixing the fuel tank 20 and is thereby fixed to the vehicle body 1. A front end portion of the fixture belt 57 is fixed by a fastening bolt to a tank attachment member 58 that is attached to the width increased section 52 of the floor frame 50. A rear end portion of the fixture belt 57 is fixed by a fastening bolt to a tank attachment member 59 that is attached to a center side in the vehicle width direction of the third crossmember 28.

The exhaust pipe 17, which extends from the engine 3, and the catalytic device 18 are arranged under the floor panel 10. The exhaust pipe 17 and the catalytic device 18 are supported by the floor panel 10. The catalytic device 18 is disposed between the front inclined sections 51 of the right and left floor frames 50, and is arranged between the automatic transmission 4 and the front inclined section 51 of the floor frame 50 on the vehicle right side as one side in the vehicle width direction.

In the exhaust pipe 17 arranged under the floor panel 10, a portion on an upstream side of the catalytic device 18 extends forward in the vehicle along the front inclined section 51 of the floor frame 50 and is coupled to the engine 3, and a portion on a downstream side of the catalytic device 18 extends inward in the vehicle width direction, then extends substantially linearly to the rear in the vehicle, and is coupled to the silencer 19.

At the position under the tunnel section 11 of the floor panel 10, the exhaust pipe 17 extends in the vehicle longitudinal direction under the propeller shaft 7. As illustrated in FIG. 6, at the position under the tunnel section 11 of the floor panel 10, the exhaust pipe 17 is disposed at such a position that a center axis 7a of the propeller shaft 7 matches a center axis 17a of the exhaust pipe 17 in the vehicle width direction.

At positions under the floor panel 10, the first and second battery units 31, 32 are disposed in a manner to be separately arranged from each other on both sides in the vehicle width direction of the propeller shaft 7. Each of the first and second battery units 31, 32 is formed as a high-voltage battery that is unitized by connecting the plural battery modules.

At positions in front of the vehicle of the kick-up section 12 of the floor panel 10, the first and second battery units 31, 32 are arranged between the width increased sections 52 of the right and left floor frames 50. The first battery unit 31 is arranged between the propeller shaft 7 and the width increased section 52 of the floor frame 50 on the vehicle left side in the vehicle width direction, and the second battery unit 32 is arranged between the propeller shaft 7 and the width increased section 52 of the floor frame 50 on the vehicle right side in the vehicle width direction. The first and second battery units 31, 32 are integrally formed as the battery pack 33 and are supported by the vehicle body 1.

Figure 8:
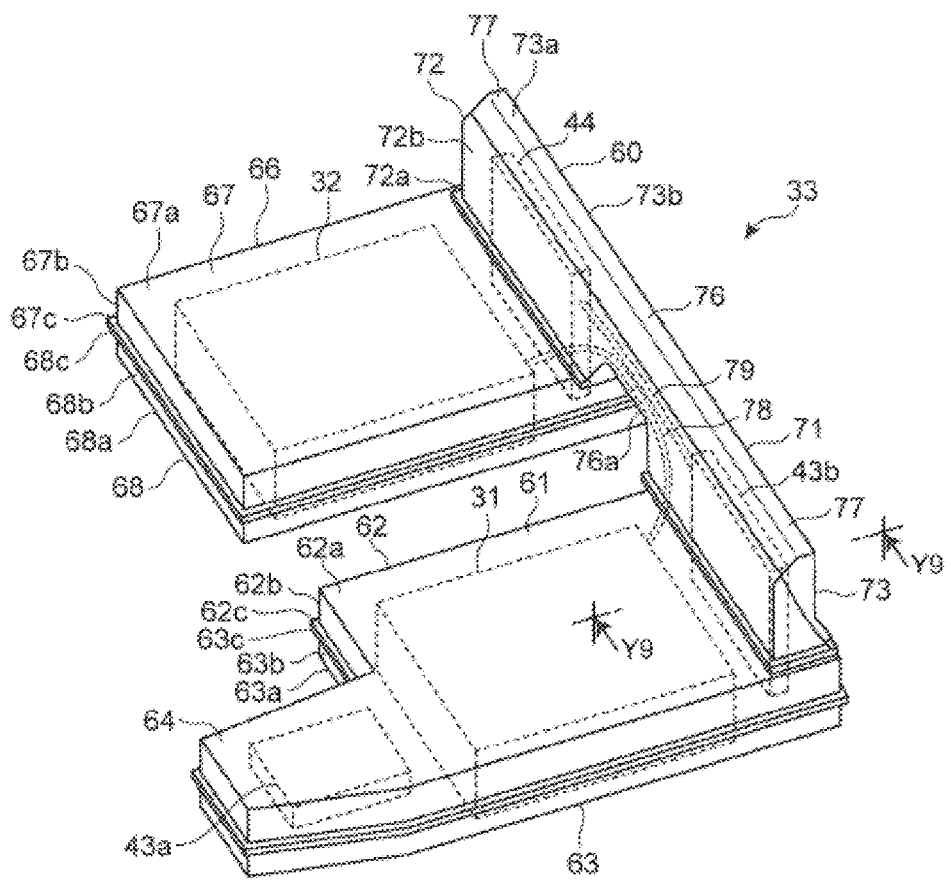
FIG. 8 is a perspective view of a battery pack.
Figure 9:
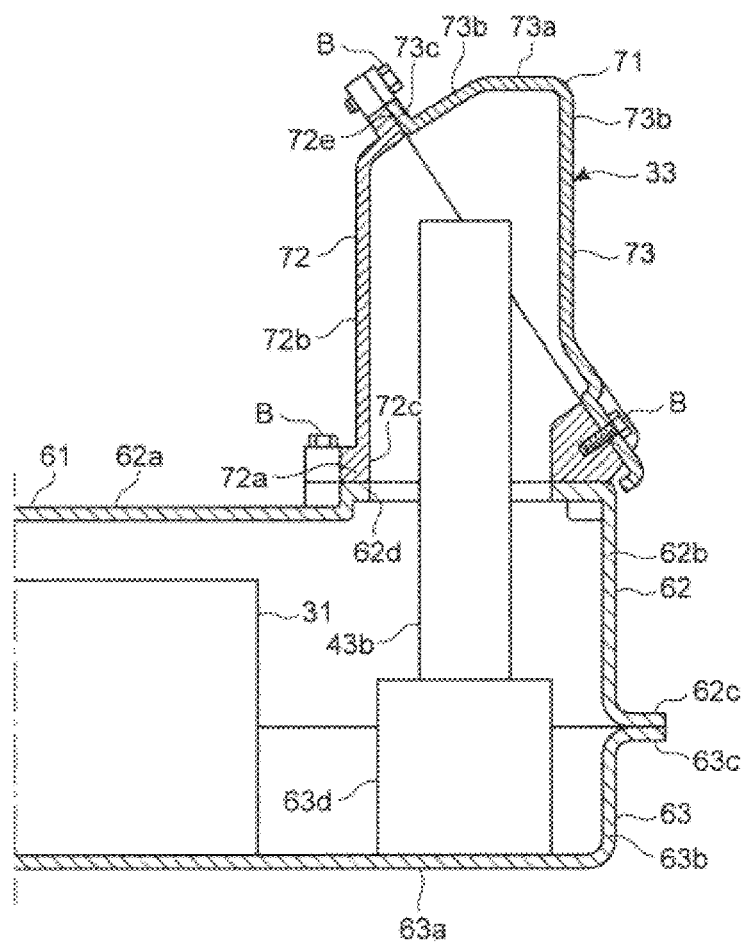
FIG. 9 is a cross-sectional view of the battery pack that is taken along line Y9-Y9 in FIG. 8.

FIG. 8 is a perspective view of the battery pack 33, and FIG. 9 is a cross-sectional view of the battery pack 33 that is taken along line Y9-Y9 in FIG. 8. As illustrated in FIG. 8 and FIG. 9, the battery pack 33 has: the first and second battery units 31, 32 that are arranged separately from each other on both sides in the vehicle width direction of the propeller shaft 7; and a battery cover 60 that accommodates the first and second battery units 31, 32.

Each of the first and second battery units 31, 32 is formed to have a substantially rectangular shape in a plan view, and is formed in a substantially rectangular parallelepiped shape. The first and second battery units 31, 32 are not limited thereto. The first and second battery units 31, 32 are formed to be substantially symmetrical on both sides in the vehicle width direction of the propeller shaft 7. As described above, the first and second battery units 31, 32 are arranged between the width increased sections 52 of the floor frames 50, and are each formed to have large battery capacity by increasing a width thereof in the vehicle width direction in comparison with a case where the width of the floor frame is not increased to the outer side in the vehicle width direction.

The battery cover 60 has: a first battery accommodation section 61 that accommodates the first battery unit 31; a second battery accommodation section 66 that accommodates the second battery unit 32; and a coupling section 71 that couples the first battery accommodation section 61 and the second battery accommodation section 66 and extends in the vehicle width direction. The battery cover 60 is formed of an aluminum material, for example.

The first battery accommodation section 61 is formed in a substantially rectangular parallelepiped shape, and is configured to include: a first upper cover member 62 that constitutes an upper side of the first battery accommodation section 61; and a first lower cover member 63 that constitutes a lower side of the first battery accommodation section 61.

The first upper cover member 62 includes: an upper surface section 62*a* that is formed in a substantially rectangular shape and extends in a substantially horizontal direction; a side surface section 62*b* that extends downward from a peripheral edge portion of the upper surface section 62*a*; and a flange section 62*c* that extends outward from a lower end portion of the side surface section 62*b* in the substantially horizontal direction. The first upper cover member 62 is formed such that the upper surface section 62*a* bulges upward.

The first lower cover member 63 includes: a lower surface section 63*a* that is formed in a substantially rectangular shape and extends in the substantially horizontal direction; a side surface section 63*b* that extends upward from a peripheral edge portion of the lower surface section 63*a*; and a flange section 63*c* that extends outward from an upper end portion of the side surface section 63*b* in the substantially horizontal direction. The first lower cover member 63 is formed such that the lower surface section 63*a* bulges downward.

The first battery accommodation section 61 is formed such that the first upper cover member 62 and the first lower cover member 63 are joined to each other by joining the flange section 62*c* and the flange section 63*c*. The first battery unit 31 is attached to the lower surface section 63*a* of the first lower cover member 63 and is accommodated in a space defined by the first upper cover member 62 and the first lower cover member 63.

The first battery accommodation section 61 is formed with a front extending section 64 that extends forward in the vehicle in a substantially rectangular parallelepiped shape from an outer side in the vehicle width direction of a vehicle front side of the first battery accommodation section 61. Each of the first upper cover member 62 and the first lower cover member 63 extends forward in the vehicle from the outer side in the vehicle width direction of the vehicle front side in a manner to form the front extending section 64.

The front junction box 43*a* is formed in a substantially rectangular parallelepiped shape and is also formed in a flat shape. The front junction box 43*a* is transversely arranged such that a height thereof in the vertical direction is lower than a length thereof in the vehicle longitudinal direction. On the vehicle front side of the first battery unit 31, the front junction box 43*a* is attached to the lower surface section 63*a* of the first lower cover member 63 that constitutes the front extending section 64, and is accommodated in the space defined by the first upper cover member 62 and the first lower cover member 63.

As illustrated in FIG. 3, in the first battery accommodation section 61, the upper surface section 62*a* of the first upper cover member 62 is formed with a first opening 62*d* at a position on the vehicle rear side of the first battery unit 31. The first opening 62*d* is formed in a substantially rectangular shape, and is also formed in a long hole shape that is longer in the vehicle width direction than in the vehicle longitudinal direction. The rear junction box 43*b*, the battery harness, and the like are inserted through the first opening 62*d*.

The second battery accommodation section 66 is formed in a substantially rectangular parallelepiped shape, and is configured to include: a second upper cover member 67 that constitutes an upper side of the second battery accommodation section 66; and a second lower cover member 68 that constitutes a lower portion of the second battery accommodation section 66.

The second upper cover member 67 includes: an upper surface section 67*a* that is formed in a substantially rectangular shape and extends in the substantially horizontal direction; a side surface section 67*b* that extends downward from a peripheral edge portion of the upper surface section 67*a*; and a flange section 67*c* that extends outward from a lower end portion of the side surface section 67*b* in the substantially horizontal direction. The second upper cover member 67 is formed such that the upper surface section 67*a* bulges upward.

The second lower cover member 68 includes: a lower surface section 68*a* that is formed in a substantially rectangular shape and extends in the substantially horizontal direction; a side surface section 68*b* that extends upward from a peripheral edge portion of the lower surface section 68*a*; and a flange section 68*c* that extends outward from an upper end portion of the side surface section 68*b* in the substantially horizontal direction. The second lower cover member 68 is formed such that the lower surface section 68*a* bulges downward.

The second battery accommodation section 66 is formed such that the second upper cover member 67 and the second lower cover member 68 are joined to each other by joining the flange section 67*c* and the flange section 68*c*. The second battery unit 32 is attached to the lower surface section 68*a* of the second lower cover member 68 and is accommodated in a space defined by the second upper cover member 67 and the second lower cover member 68.

As illustrated in FIG. 3, in the second battery accommodation section 66, the upper surface section 67*a* of the second upper cover member 67 is formed with a second opening 67*d* at a position on the vehicle rear side of the second battery unit 32. The second opening 67*d* is formed in a substantially rectangular shape, and is also formed in a long hole shape that is longer in the vehicle width direction than in the vehicle longitudinal direction. The battery control unit 44, the battery harness, and the like are inserted through the second opening 67*d*.

The coupling section 71 is formed in a substantially rectangular parallelepiped shape that extends longer in the vehicle width direction than in the vehicle longitudinal direction and the vertical direction. The coupling section 71 couples vehicle rear sides of the first battery accommodation section 61 and the second battery accommodation section 66. The coupling section 71 is formed such that a length thereof in the vehicle longitudinal direction is less than that of each of the first and second battery accommodation sections 61, 66.

The coupling section 71 is higher than the first and second battery accommodation sections 61, 66, couples the first and second battery accommodation sections 61, 66, extends in the vehicle width direction, and is arranged next to a vehicle front side of the fuel tank 20. As illustrated in FIG. 9, the coupling section 71 is configured to include: a front cover member 72 that constitutes a vehicle front side of the coupling section 71; and a rear cover member 73 that constitutes a vehicle rear side of the coupling section 71.

The front cover member 72 includes: a lower surface section 72a that is attached to the upper surface sections 62a, 67a of the first and second battery accommodation sections 61, 66; and a peripheral wall section 72b that extends upward from the lower surface section 72a. As illustrated in FIG. 3, in the lower surface section 72a of the front cover member 72, a first opening 72c and a second opening 72d are formed on both sides in the vehicle width direction. The first opening 72c and the second opening 72d respectively correspond to the first opening 62d of the first battery accommodation section 61 and the second opening 67d of the second battery accommodation section 66.

The first and second openings 72c, 72d of the front cover member 72 are formed in the substantially same shapes as the first and second openings 62d, 67d of the first and second battery accommodation sections 61, 66. Each of the first and second openings 72c, 72d of the front cover member 72 is formed in a substantially rectangular shape, and is also formed in a long hole shape that is longer in the vehicle width direction than in the vehicle longitudinal direction. The rear junction box 43b, the battery harness, and the like are inserted through the first opening 72c. The battery control unit 44, the battery harness, and the like are inserted through the second opening 72d.

The peripheral wall section 72b of the front cover member 72 extends upward from the lower surface section 72a and constitutes the vehicle front side and both sides in the vehicle width direction of the coupling section 71. A vehicle rear side of the peripheral wall section 72b is formed with a mating surface 72e with the rear cover member 73. The entire mating surface 72e in the vehicle width direction of the front cover member 72 is formed to be inclined downward toward the vehicle rear side.

The rear cover member 73 includes: an upper surface section 73a; and a peripheral wall section 73b that extends downward from the upper surface section 73a. The peripheral wall section 73b of the rear cover member 73 extends downward from the upper surface section 73a and constitutes the vehicle rear side and both sides in the vehicle width direction of the coupling section 71. A vehicle front side of the peripheral wall section 73b is formed with a mating surface 73c with the front cover member 72. The entire mating surface 73c in the vehicle width direction of the rear cover member 73 is formed to be inclined downward toward the vehicle rear side.

In the front cover member 72, the lower surface section 72a is superposed on the upper surface sections 62a, 67a of the first and second battery accommodation sections 61, 66 and is joined to the first and second battery accommodation sections 61, 66 by using plural fastening bolts B, each of which extends in the vertical direction. The rear cover member 73 is joined to the front cover member 72 using plural fastening bolts B, each of which is inclined and extends forward and under the vehicle, by causing the mating surface 73c of the rear cover member 73 to mate with the mating surface 72e of the front cover member 72.

The coupling section 71 is formed with a hollow space therein by joining the front cover member 72 and the rear cover member 73 to each other. The coupling section 71 has a concave section 76a in a lower side of a center section 76 in the vehicle width direction, and the concave section 76a is dented upward. The concave section 76a of the coupling section 71 is formed between the first battery accommodation section 61 and the second battery accommodation section 66 in the vehicle width direction in a manner to correspond to the tunnel section 11 of the floor panel 10.

In the coupling section 71, the center section 76 in the vehicle width direction is formed such that a length thereof in the vertical direction is reduced by the concave section 76a to be shorter than that of an outer section 77 in the vehicle width direction on each side of the center section 76. The center section 76 in the vehicle width direction of the coupling section 71 functions as a fragile section 76 that is fragile with respect to the impact load applied from the outer side in the vehicle width direction when the impact load is applied to the battery pack 33 from the outer side in the vehicle width direction.

The rear junction box 43b is arranged in the outer section 77 in the vehicle width direction on the vehicle left side of the coupling section 71. The rear junction box 43b is formed in a flat shape and is vertically arranged such that a length thereof in the vehicle longitudinal direction is less than a height thereof in the vertical direction.

As illustrated in FIG. 9, the rear junction box 43b is attached onto a base 63d that is provided in the first battery accommodation section 61, and is accommodated in the coupling section 71 and the first battery accommodation section 61 through the first opening 62d of the first battery accommodation section 61 and the first opening 72c of the coupling section 71. The rear junction box 43b is arranged next to the vehicle front side of the fuel tank 20 such that a height thereof is greater than that of each of the first and second battery units 31, 32.

The battery control unit 44 is arranged in the outer section 77 in the vehicle width direction on the vehicle right side of the coupling section 71. The battery control unit 44 is formed in a flat shape and is vertically arranged such that a length thereof in the vehicle longitudinal direction is less than a height thereof in the vertical direction.

Similar to the rear junction box 43b, the battery control unit 44 is attached onto a base that is provided in the second battery accommodation section 66, and is accommodated in the coupling section 71 and the second battery accommodation section 66 through the second opening 67d of the second battery accommodation section 66 and the second opening 72d of the coupling section 71. The battery control unit 44 is arranged next to the vehicle front side of the fuel tank 20 such that a height thereof is greater than that of each of the first and second battery units 31, 32.

As illustrated in FIG. 8, in the coupling section 71, the battery harnesses such as a battery harness 78 and a battery harness 79 extend in the vehicle width direction through the center section 76 in the vehicle width direction. The battery harness 78 electrically connects the first and second battery units 31, 32. The battery harness 79 electrically connects the rear junction box 43b and the battery control unit 44.

As illustrated in FIG. 6, in regard to the battery pack 33, plural attachment sections 61a, 66a on the outer sides in the vehicle width direction of the first and second battery accommodation sections 61, 66 are fixed to the floor frame 50 by using plural fastening bolts B, plural attachment sections 61b, 66b on the inner sides in the vehicle width direction of the first and second battery accommodation sections 61, 66 are fixed to the tunnel reinforcing member 54 by using plural fastening bolts B. In this way, at a position next to the vehicle front side of the fuel tank 20, the battery pack 33 can be attached to a lower portion of the floor panel 10.

When the battery pack 33 is attached to the lower portion of the floor panel 10, the first and second battery units 31, 32 are separately arranged from each other on both sides in the vehicle width direction of the propeller shaft 7, the coupling section 71 can be arranged under the kick-up section 12 of the floor panel 10 and above the propeller shaft 7, and the battery harness 78, which electrically connects the first and second battery units 31, 32, can be disposed in a manner to run above the propeller shaft 7.

In addition, the coupling section 71 of the battery pack 33 is arranged to be higher than the first and second battery accommodation sections 61, 66, and, at the position under the kick-up section 12 of the floor panel 10 arranged under the rear seat 26, can be arranged in front of the vehicle of the fuel tank 20.

The rear junction box 43b and the battery control unit 44 are arranged under the kick-up section 12 of the floor panel 10, and are separately arranged from each other on both sides in the vehicle width direction of the propeller shaft 7. The battery control unit 44 can be arranged at such a position that the battery control unit 44 overlaps at least a part of the rear junction box 43b in the vehicle longitudinal direction in a vehicle side view.

As illustrated in FIG. 5, the inverter 41 and the DC/DC converter 42 as the battery-related electrical components are arranged in the battery pack 33, more specifically, at positions near the vehicle front side of the first battery accommodation section 61. Each of the inverter 41 and the DC/DC converter 42 is formed in a flat shape, and is transversely arranged such that a height thereof in the vertical direction is less than a length thereof in the vehicle longitudinal direction. As illustrated in FIG. 3, each of the inverter 41 and the DC/DC converter 42 is formed in a substantially rectangular shape in the plan view.

Each of the inverter 41 and the DC/DC converter 42 is formed to have a width in the vehicle width direction that is less than that of each of the first and second battery units 31, 32. The DC/DC converter 42 is formed such that the width thereof in the vehicle width direction is less than that of the inverter 41 and the length thereof in the vehicle longitudinal direction is greater than that of the inverter 41.

The inverter 41 and the DC/DC converter 42 are arranged between the front inclined sections 51 of the right and left floor frames 50, and are arranged between the transmission 4 and the front inclined section 51 of the floor frame 50 on the vehicle left side. The inverter 41 and the DC/DC converter 42 can be arranged such that inner sides thereof in the vehicle width direction substantially match each other in the vehicle width direction.

The DC/DC converter 42 is arranged in front of the vehicle of the inverter 41, and is arranged on an upper side of the inverter 41 in a superposing manner in the vertical direction. As illustrated in FIG. 5 and FIG. 7, in a state of being accommodated in an inverter case 41a and a converter case 42a, the inverter 41 and the DC/DC converter 42 can be directly or indirectly attached to the floor panel 10 by using plural fastening bolts B.

The inverter 41 and the DC/DC converter 42 are arranged between the transmission 4 and the floor frame 50 on the vehicle left side, and the catalytic device 18 is arranged between the transmission 4 and the floor frame 50 on the vehicle right side. The catalytic device 18 and a combination of the inverter 41 and the DC/DC converter 42 are separately arranged from each other on one side and the other side in the vehicle width direction. In the vehicle side view, the inverter 41 and the DC/DC converter 42 are arranged at positions that overlap at least a part of the catalytic device 18 in the vehicle longitudinal direction.

The inverter 41 and the DC/DC converter 42 are electrically connected to the first battery unit 31 and the front junction box 43a by a battery harness 80 as the high-voltage harness. On the inner side in the vehicle width direction of the front extending section 64 of the first battery accommodation section 61, the battery harness 80, which electrically connects the combination of the inverter 41 and the DC/DC converter 42 to a combination of the first battery unit 31 and the front junction box 43a, can extend in the vehicle longitudinal direction along the front extending section 64.

The vehicle body 1 can also include a battery-related electrical component such as a heater unit at a position between the transmission 4 and the front inclined section 51 of the floor frame 50 on the vehicle left side. The heater unit warms the cabin 25. The heater unit is formed in a flat shape, and is configured by a sheet like electric wire heater, a positive temperature coefficient (PTC) heater, for example.

In the vehicle body 1 that is configured as described above, in the case where the impact load is applied thereto from the front side of the vehicle body during the frontal collision, and the impact load is applied to the drive source 2 from the front side of the vehicle body, the vehicle front side of the differential 8 can rotate downward, the vehicle rear side of the propeller shaft 7 can move downward and can be deformed, and the drive source 2 can move rearward in the vehicle body.

At the positions under the floor panel 10, the first and second battery units 31, 32 are arranged on both sides in the vehicle width direction of the propeller shaft 7. Thus, even in the case where the vehicle rear side of the propeller shaft 7 moves downward and is deformed, it can be possible to suppress the propeller shaft 7 from coming into contact with the first and second battery units 31, 32. The battery harness 78, which electrically connects the first and second battery units 31, 32, can be arranged to run above the propeller shaft 7. Thus, it also can be possible to suppress the propeller shaft 7 from coming into contact with the battery harness 78.

In addition, the vehicle body 1 includes the fragile section 76 in the coupling section 71 of the battery pack 33. Accordingly, in the case where the impact load is applied to the vehicle body 1 from the outer side in the vehicle width direction during a lateral collision, and the impact load is applied to the battery pack 33 from the outer side in the vehicle width direction, the fragile section 76 can be crushed and deformed. Thus, it can be possible to suppress the first and second battery accommodation sections 61, 66 from being crushed and deformed.

As described above, the vehicle lower structure according to this embodiment can include, at the position under the floor panel 10, the battery pack 33 having: the first and second battery units 31, 32 that are separately arranged from each other on both sides in the vehicle width direction of the propeller shaft 7; and the battery cover 60. The battery cover 60 has the first battery accommodation section 61, the second battery accommodation section 66, and the coupling section 71 that couples the first and second battery accommodation section 61, 66 and extends in the vehicle width direction. The coupling section 71 includes the fragile section 76 between the first and second battery accommodation sections 61, 66 in the vehicle width direction.

In this way, in the vehicle that includes the battery pack 33 arranged under the floor panel 10 and having the first and second battery units 31, 32 arranged on both sides in the vehicle width direction of the propeller shaft 7, when the impact load is applied to the battery pack 33 from the outer side in the vehicle width direction during the lateral collision, the fragile section 76 provided in the coupling section 71 can be crushed and deformed. As a result, it can be possible to suppress the first and second battery accommodation sections 61, 66 from being crushed and deformed. Therefore, it can be possible to protect the first and second battery units 31, 32 that are respectively arranged in the first and second battery accommodation sections 61, 66.

Also, in the case where the impact load from the outer side in the vehicle width direction is applied to the battery pack 33 at the position that is offset from the coupling section 71 in the vehicle longitudinal direction, the fragile section 76 provided in the coupling section 71 can be crushed and deformed. In this way, it can be possible to suppress the battery pack 33 from rotationally moving with a portion of the battery pack 33 between the first and second battery accommodation sections 61, 66 being a center. As a result, the first and second battery units 31, 32 can be protected. That is, when the collision load is applied to the battery pack 33, due to the crush and the deformation of the fragile section 76, the battery accommodation sections 61, 66, which receive the collision load, can move inward in the vehicle width direction. Thus, the first and second battery accommodation sections 61, 66, which receive the collision load, can be suppressed from rotationally moving with the portion between the battery accommodation sections 61, 66 in the battery pack 33 being the center. It can be possible to suppress concentration of the collision load on the portions of the battery accommodation sections 61, 66, which receive the collision load, due to the rotational movement and the damage to such portions. Therefore, the battery units 31, 32 can be protected.

In addition, the coupling section 71 couples the vehicle rear sides of the first battery accommodation section 61 and the second battery accommodation section 66, and extends in the vehicle width direction at the position above the propeller shaft 7. The vehicle rear sides of the first and second battery accommodation sections 61, 66 are coupled by the coupling section 71 that extends in the vehicle width direction at the position above the propeller shaft 7. Thus, even in the case where the impact load is applied to the propeller shaft 7 from the front side of the vehicle body during the frontal collision, and the propeller shaft 7 moves downward and is deformed, it can be possible to suppress the propeller shaft 7 from coming into contact with battery pack 33. Therefore, the battery pack 33 can be protected.

Also, in the case where the impact load from the outer side in the vehicle width direction is applied to the vehicle front side and the center side in the vehicle longitudinal direction of the battery pack 33, the fragile section 76 provided in the coupling section 71 can be crushed and deformed. Thus, it can be possible to suppress the first and second battery accommodation sections 61, 66 from being crushed and deformed. As a result, the first and second battery units 31, 32 can be protected.

In the case where the high-voltage harness 78, which electrically connects the first and second battery units 31, 32, is arranged in the coupling section 71, due to the arrangement of the coupling section 71 above the propeller shaft 7, it may be difficult for a worker to access to the high-voltage harness 78. Thus, it can be possible to suppress the worker from coming into contact with the high-voltage harness 78.

The vehicle rear sides of the first and second battery accommodation sections 61, 66 can be coupled by the coupling section 71, which extends in the vehicle width direction, at the position above the propeller shaft 7. Thus, in the case where the floor panel 10 is formed with a stepped section that is projected upward in a manner to correspond to the coupling section 71, the step section can be provided in the vehicle rear side of the floor panel 10. As a result, compared to a case where the coupling section 71 couples the center sides in the vehicle longitudinal direction of the first and second battery accommodation sections 61, 66, a cabin space can be used effectively.

The fragile section 76 can be formed such that the length thereof in the vertical direction is shorter than the rest of the portions of the coupling section 71 other than the fragile section 76. That is, the fragile section 76 can be formed by reducing the length in the vertical direction of the coupling section 71 to be shorter than the rest of the portions thereof. Thus, the fragile section 76 can be formed relatively easily, and the first and second battery units 31, 32 can thereby be protected relatively easily.

The battery control unit 44 and the junction box 43 can be arranged on both sides in the vehicle width direction of the fragile section 76 in the coupling section 71. The battery control unit 44 and the junction box 43 can be arranged on both sides in the vehicle width direction of the fragile section 76 in the coupling section 71. Thus, when the collision load is applied from the outer side in the vehicle width direction during the lateral collision, the fragile section 76 provided in the coupling section 71 can be crushed and deformed. In this way, the battery control unit 44 and the junction box 43 can be protected.

In the above-described embodiment, the fragile section 76 of the coupling section 71, which is provided in the battery pack 33, can be formed such that the length thereof in the vertical direction is shorter than the rest of the portions of the coupling section 71. However, it also can be possible to form the fragile section 76 to be thinner than the other portions of the coupling section 71.

Just as described, also in the case where the fragile section 76 is formed to be thinner than the rest of the portions of the coupling section 71 other than the fragile section thereof, the fragile section can be formed relatively easily. Thus, it can be possible to protect the first and second battery units 31, 32, which are arranged on both sides in the vehicle width direction of the propeller shaft 7, relatively easily.

Figure 10:
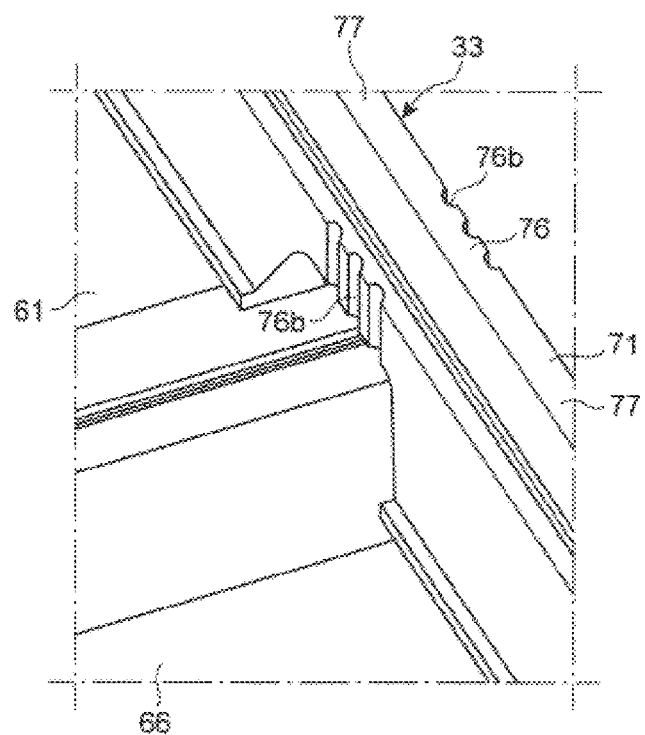
FIG. 10 is an explanatory view for illustrating a modified example of a coupling section of the battery pack.

FIG. 10 is an explanatory view for illustrating a modified example of the coupling section of the battery pack. As illustrated in FIG. 10, as the fragile section 76 of the coupling section 71 provided in the battery pack 33, the fragile section 76, which extends in an orthogonal direction to the vehicle width direction and is dented in the coupling section 71, can be formed by forming a concave section 76*b* between the first and second battery accommodation sections 61, 66 in the vehicle width direction of the coupling section 71. Alternatively, the fragile section 76 can be formed by forming the concave section 76*b*, which extends in the vertical direction and is dented in the coupling section 71, in a front surface portion and a rear surface portion arranged in the vehicle longitudinal direction of the coupling section 71.

Just as described, also in the case where the fragile section 76 has the concave section 76*b*, which extends in the orthogonal direction to the vehicle width direction and is dented in the coupling section 71, the fragile section 76 can be formed relatively easily. Thus, it can be possible to protect the first and second battery units 31, 32, which are arranged on both sides in the vehicle width direction of the propeller shaft 7, relatively easily.

In this embodiment, the drive motor 5 is arranged between the engine 3 and the transmission 4. However, the drive motor may be arranged separately from the engine 3 and the transmission 4, and the power from at least one of the engine 3 and the drive motor 5 may be transmitted to the drive wheels 6.

The vehicle according to this embodiment is the hybrid vehicle of an engine vertically arranged type in which the engine 3 is arranged in the vehicle front side and the power from the engine 3 is transmitted to the drive wheels 6 arranged in the vehicle rear side. However, embodiments of the present disclosure can also be applied to a four-wheel-drive hybrid vehicle of the engine vertically arranged type and a four-wheel-drive hybrid vehicle of an engine transversely arranged type that is based on the front-engine, front-wheel-drive vehicle.

The present disclosure is not limited to the exemplary embodiment, and various improvements and design changes can be made thereto within the scope that does not depart from the gist of the present disclosure.

INDUSTRIAL APPLICABILITY

As it has been described so far, according to the present disclosure, in the vehicle that includes, at the position under the floor panel, the battery pack having the first and second battery units arranged on both sides in the vehicle width direction of the propeller shaft, the first and second battery units can be protected during the lateral collision. Thus, there is a possibility that the present disclosure can be favorably used in this type of the vehicle.

The invention claimed is:

1. A vehicle lower structure comprising:
a drive source having a drive motor;
a floor panel forming a floor surface of a cabin;
a propeller shaft extending in a vehicle longitudinal direction at a position under the floor panel to transmit power from the drive source to a drive wheel;
a battery pack arranged under the floor panel and having:
a first battery unit and a second battery unit that are separately arranged from each other on both sides in a vehicle width direction of the propeller shaft and storing electricity to be supplied to the drive motor; and
a battery cover,
wherein the battery cover has:
a first battery accommodation section accommodating the first battery unit;
a second battery accommodation section accommodating the second battery unit; and
a coupling section that couples the first battery accommodation section and the second battery accommodation section and extends in the vehicle width direction, and the coupling section includes a fragile section between the first battery accommodation section and the second battery accommodation section in the vehicle width direction, the fragile section being fragile with respect to an impact load that is applied to the battery pack from an outer side in the vehicle width direction,
wherein the fragile section is adjacent to a battery controller and a junction box, and
wherein the battery controller and the junction box are behind the first battery accommodation section and the second battery accommodation section in the vehicle longitudinal direction.

2. The vehicle lower structure according to claim 1, wherein the coupling section couples vehicle rear sides of the first battery accommodation section and the second battery accommodation section, and extends in the vehicle width direction at a position above the propeller shaft.

3. The vehicle lower structure according to claim 2, wherein the fragile section is formed such that a length thereof in a vertical direction is shorter than portions of the coupling section other than the fragile section.

4. The vehicle lower structure according to claim 3, wherein the fragile section is thinner than the portions of the coupling section other than the fragile section.

5. The vehicle lower structure according to claim 4,
wherein the fragile section has a concave section that extends in an orthogonal direction to the vehicle width direction and is dented in the coupling section, and
wherein an upper surface of the fragile section is complete) linear from the first battery accommodation section to the second battery accommodation section in the vehicle width direction.

6. The vehicle lower structure according to claim 5, wherein the battery control controller and the junction box are on opposite sides of the fragile section in the coupling section in the vehicle width direction.

7. The vehicle lower structure according to claim 1,
wherein the fragile section is formed such that a length thereof in a vertical direction is shorter than portions of the coupling section other than the fragile section,
wherein the fragile section is thinner than portions of the coupling section other than the fragile section, and
wherein an upper surface of the fragile section is linear from the first battery accommodation section to the second battery accommodation section in the vehicle width direction.

8. The vehicle lower structure according to claim 1, wherein the fragile section has a concave section that extends in an orthogonal direction to the vehicle width direction and is dented in the coupling section.

9. The vehicle lower structure according to claim 1, wherein the battery control controller and the junction box are on opposite sides of the fragile section in the coupling section in the vehicle width direction.

10. The vehicle lower structure according to claim 2, wherein the fragile section is thinner than portions of the coupling section other than the fragile section.

11. The vehicle lower structure according to claim 2, wherein the fragile section has a concave section that extends in an orthogonal direction to the vehicle width direction and is dented in the coupling section.

12. Tire vehicle lower structure according to claim 2, wherein the battery control controller and the junction box are on opposite sides of the fragile section in the coupling section in the vehicle width direction.

13. The vehicle lower structure according to claim 3, wherein the battery control controller and the junction box are on opposite sides of the fragile section in the coupling section in the vehicle width direction.

14. The vehicle lower structure according to claim 7, wherein the battery control controller and the junction box are on opposite sides of the fragile section in the coupling section in the vehicle width direction.

15. The vehicle lower structure according to claim 8, wherein the battery control controller and the junction box are on opposite sides of the fragile section in the coupling section in the vehicle width direction.

16. The vehicle lower structure according to claim 11, wherein the battery control controller and the junction box are on opposite sides of the fragile section in the coupling section in the vehicle width direction.

17. The vehicle lower structure according to claim 1, wherein the fragile section is at a height above the first battery accommodation section and the second battery accommodation section in the vertical direction.

18. The vehicle lower structure according to claim 1, wherein the coupling section is entirely rearward of the first and second battery units in the vehicle longitudinal direction.

19. The vehicle lower structure according to claim 1, wherein a portion of the junction box is in front of one of the first battery unit or the second battery unit.

* * * * *